United States Patent
Tashima et al.

(10) Patent No.: US 8,301,858 B2
(45) Date of Patent: Oct. 30, 2012

(54) CONTROL DEVICE

(75) Inventors: Keisuke Tashima, Kawasaki (JP); Yukio Oguma, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 549 days.

(21) Appl. No.: 12/474,857

(22) Filed: May 29, 2009

(65) Prior Publication Data

US 2010/0030976 A1 Feb. 4, 2010

(30) Foreign Application Priority Data

Aug. 1, 2008 (JP) ................................. 2008-200051

(51) Int. Cl.
*G06F 13/00* (2006.01)
(52) U.S. Cl. ........................................................ 711/170
(58) Field of Classification Search .................... 711/170
See application file for complete search history.

(56) References Cited

U.S. PATENT DOCUMENTS

| | | | |
|---|---|---|---|
| 7,694,122 B2 * | 4/2010 | Lee | 713/2 |
| 2005/0154850 A1 * | 7/2005 | Collins | 711/170 |
| 2006/0004978 A1 * | 1/2006 | Nakayama | 711/170 |
| 2006/0064563 A1 * | 3/2006 | Hobson | 711/170 |
| 2006/0271778 A1 * | 11/2006 | Lee | 713/2 |
| 2007/0101114 A1 * | 5/2007 | Inoue et al. | 713/1 |

FOREIGN PATENT DOCUMENTS

JP 2007-122627 5/2007

\* cited by examiner

*Primary Examiner* — Hoai V Ho
*Assistant Examiner* — Jay Radke
(74) *Attorney, Agent, or Firm* — Fujitsu Patent Center

(57) ABSTRACT

A control device is connected to a processor, a memory module, and a specification information storage memory for storing specification information indicating specifications of the memory module. The control device includes: a readout unit that reads the specification information from the specification information storage memory when power is turned on to the control device; a storage unit that stores the specification information read from the specification information storage memory; and a transfer unit that receives a specification information read instruction from the processor, and that transfers the specification information stored in the storage unit to the processor.

11 Claims, 8 Drawing Sheets

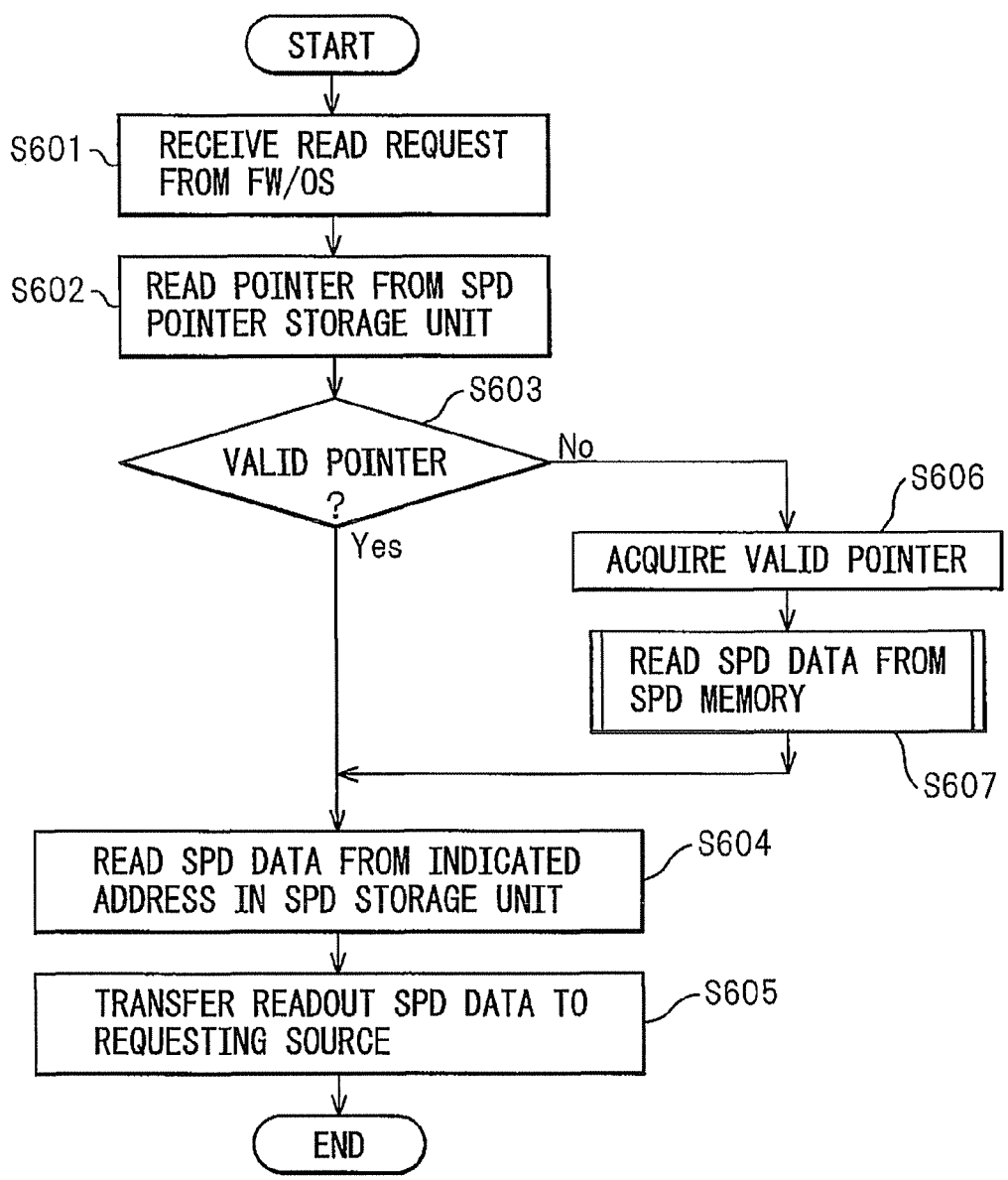

CONTROL DEVICE

CROSS-REFERENCE TO RELATED APPLICATIONS

This application is based upon and claims the benefit of priority of the prior Japanese Patent Application No. 2008-200051, filed on Aug. 1, 2008, the entire contents of which are incorporated herein by reference.

FIELD

The present application relates to a control device, an information processing apparatus, and a memory module recognizing method.

BACKGROUND

When power is turned on to a computer system, an operating system (OS) startup process called a boot process (also called a "power-on reset sequence") is initiated. The startup process includes initializing and diagnosing various pieces of hardware by OS and firmware such as BIOS (Basic input Output System), and configuring the various pieces of hardware into the computer system.

Further, during memory initialization, a memory recognizing process is performed in which the BIOS that is executed by a CPU (Central Processing Unit) instructs a memory controller to perform a read operation thereby reading memory module specification information (hereinafter called the "SPD (Serial Presence Detect) data") stored in a nonvolatile memory (hereinafter called the "SPD memory") mounted on a memory module.

Based on the SPD data which defines memory type and capacity, presence or absence of error checking, type of error checking, access timing, etc., the BIOS initializes RAM (Random Access Memory) mounted on the memory module and determines the method for controlling the memory module.

Usually, the SPD memory and the memory controller are connected by a serial bus whose transfer speed is slow. One example of such a serial bus is an I²C bus. The reason for using a slow serial bus is that the memory recognizing process is not frequently performed and, besides, the amount of the SPD data is small, so that a simple and low-cost bus is the logical choice. However, the slow transfer speed of the serial bus involves the problem that the memory initialization process becomes slow.

To enhance the speed of the memory recognizing process, there is proposed a technique in which the SPD data initially read by the CPU via a serial bus is stored in a memory accessible via a system bus so that the SPD data can be accessed more quickly when reading it for the second and subsequent times. Known examples of such a memory recognizing process include one disclosed in Japanese Unexamined Patent Publication No. 2007-122627.

SUMMARY

According to an aspect of the embodiment, a control device connected to a processor, a memory module, and a specification information storage memory for storing specification information indicating specifications of the memory module, comprising: a readout unit that reads the specification information from the specification information storage memory when power is turned on to the control device; a storage unit that stores the specification information read from the specification information storage memory; and a transfer unit that receives a read instruction from the processor to read the specification information, and that transfers the specification information stored in the storage unit to the processor.

The object and advantages of the invention will be realized and attained by means of the elements and combinations particularly pointed out in the appended claims. It is to be understood that both the foregoing general description and the following detailed description are exemplary and explanatory and are not restrictive of the invention, as claimed.

BRIEF DESCRIPTION OF DRAWINGS

FIG. 8 is a diagram illustrating one example of a flow for reading the SPD data from the SPD storage unit by a read request from FW or OS.

DESCRIPTION OF EMBODIMENTS

SPD data read operation may be performed using the BIOS executed by the processor, therefore the SPD data read operation has to be started by waiting until the processor completes its initialization process. Furthermore, if the first SPD data read operation after starting up the processor is performed via a serial bus, the time required for memory recognition adds to the computer system startup time, and as a result, the startup time cannot be reduced.

An embodiment of the present invention provides a memory initialization process that reduces the computer system startup time by loading the SPD data prior to the processor initialization.

An SPD control device can reduce the memory initialization time as well as the computer system startup time by starting to read the SPD data from the SPD memory upon power-on of the SPD control device, without waiting for the processor to complete its initialization process.

An embodiment will be described below with reference to the drawings.

Figure 1:
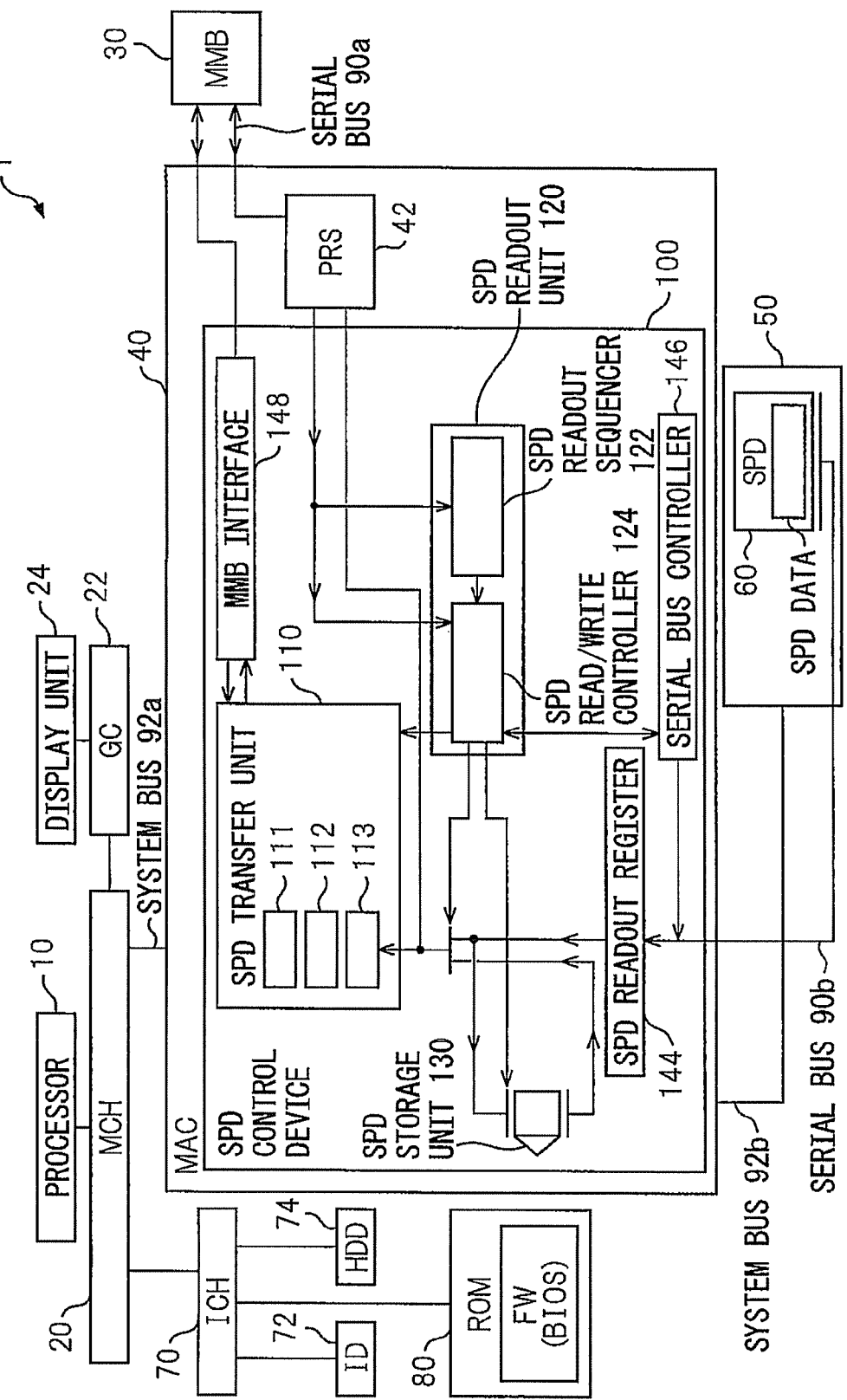
FIG. 1 is a diagram illustrating one configuration example of an information processing apparatus.

One configuration example of an information processing apparatus will be described with reference to FIG. 1. The information processing apparatus 1 can be implemented, for example, as a computer such as a server or a personal computer. The information processing apparatus 1 includes a processor 10, a memory controller hub (MCH) 20, a management board (MMB) 30, a memory access controller (MAC) 40, a memory module 50, an SPD memory 60, an I/O control hub (ICH) 70, an input device 72, an external storage device 74, and a read-only memory (ROM) 80.

The processor 10 is responsible for controlling the operation of the information processing apparatus 1, and can be implemented as a central processing unit (CPU) or a digital signal processor (DSP). The processor 10 executes various kinds of software including the operating system (OS) which centrally manages the allocation of computer hardware and software resources. The processor 10 also executes the BIOS stored in the ROM 80. The BIOS is a program for controlling hardware devices connected via buses, and performs operations such as initialization of the RAMs mounted on the memory module 50. The control operations by the BIOS are performed by the processor 10 executing the BIOS. Only one processor is illustrated in FIG. 1, but the information processing apparatus 1 may include more than one processor.

The MCH 20 is a bridge device that connects between the processor 10 and the ICH 70. Each piece of hardware connected to the MCH 20 is connected by a high-speed system bus such as an ISA (Industrial Standard Architecture) bus or a PCI (Peripheral Components Interconnect) bus. The MCH 20 has the function of performing communication with a graphics controller (GC) 22 via an AGP (Accelerated Graphics Port) bus or the like.

The memory module 50 includes the RAMs (Random Access Memories) mounted on a DIMM (Dual Inline Memory Module) or the like. The memory module 50 further includes the SPD memory 60. The SPD memory 60 is a memory for storing SPD data, and is constructed from a nonvolatile memory, for example, an EEPROM (Electrically Erasable and Programmable Read Only Memory). Only one memory module is illustrated in FIG. 1, but the information processing apparatus 1 may include more than one memory module.

The SPD data is information that defines the specifications of the memory module 50, such as the capacity of the memory module 50, the operating clock frequency of the memory module, access speed, access method, and memory configuration information.

The graphics controller 22 is a display controller for controlling a display unit 24 which is used as a display monitor of the information processing apparatus 1. The ICH 70 controls access to the input device (ID) 72, external storage device (HDD) 74, and ROM 80 connected via an IDE (Integrated Drive Electronics) bus, a PCI (Peripheral Component Interconnect) bus, etc. The OS and various other programs to be executed by the processor 10 are stored on the external storage device (HDD) 74. The ROM 80 may be replaced by a rewritable nonvolatile memory, and is used to store firmware (FW) such as the BIOS.

The MAC 40 is a device for controlling the memory module 50, and includes an SPD control device 100 and a power-on reset sequencer (PRS) 42. The MAC 40 can be implemented as a chip set. The PRS 42 is a sequence circuit that performs necessary processing to initiate the SPD data read operation. For example, the PRS 42 initiates the SPD data read operation upon power-on of the MAC 40 or in accordance with a startup instruction from the MMB 30 connected via a serial bus 90a. Then, the PRS 42 sends an SPD read instruction to an SPD readout unit 120, thereby loading the SPD data into an SPD storage unit 130 and transferring the SPD data to an SPD transfer unit 110.

The MMB 30 is a device for managing the resources of the information processing apparatus 1, and is connected to a plurality of information processing apparatus via a LAN, a serial bus, etc. The MMB 30 performs management control such as sending a startup instruction to the information processing apparatus 1 when the usage of the resources of other information processing apparatus has increased. The MMB 30 can also acquire the SPD data from the SPD transfer unit 110 via an MMB interface 148. Since the PRS 42 can cause the SPD data to be transferred to the SPD transfer unit upon power-on of the MAC 40, the MMB 30 can acquire the SPD data by issuing a startup instruction to the MAC 40, without having to power up the processor 10.

The SPD control device 100 includes an SPD readout register 144 and a serial bus controller 146 in addition to the SPD transfer unit 110, SPD readout unit 120, and SPD storage unit 130. The SPD control device 100 is connected to the processor 10 via a system bus 92a and via the MCH 20. Further, the SPD control device 100 is connected to the memory module 50 via a system bus 92b and to the SPD memory 60 via a serial bus 90b. The SPD control device 100 can be implemented as a chip set.

The SPD transfer unit 110 functions as an interface for the FW or OS to acquire the SPD data. The SPD transfer unit 110 includes a command/address register 111, a status register 112, and a read data register 113. To acquire the SPD data, the FW or OS loads an operation code such as a read code and a desired SPD read address into the command/address register 111. The SPD address is an address having a channel number, slot number, offset, etc. for identifying the SPD data.

The status register 112 stores bit data that indicates the status of the SPD data read operation. Bit data "1" indicates that the SPD data read operation is being processed, while bit data "0" indicates that no SPD data read operation is being processed. For example, when the command and address held in the command/address register 111 are decoded by the SPD transfer unit 110, the SPD transfer unit 110 sets the bit data stored in the status register 112 to "1".

By decoding the command and address held in the command/address register 111, the SPD transfer unit 110 recognizes the SPD data read instruction from the FW or OS, and sets a "Busy" flag in the status register 112. Then, the SPD readout unit 120 reads the SPD data from the SPD storage unit 130 or retrieves the SPD data from the SPD memory 60 via the serial bus 90b, and loads the SPD data into the read data register 113, whereupon the "Busy" flag in the status register 112 is unset. This means that the SPD transfer unit 110 has completed the SPD data read operation. The FW or OS polls the status register 112 and, upon confirming that the "Busy" flag is unset, reads the SPD data from the read data register 113.

Here, the read data register 113 may have a capacity that can store all the SPD data from the SPD storage unit 130. In this case, all the SPD data whose amount is larger than that of several words can be transferred at a time by a burst transfer, rather than a bit-by-bit transfer that matches the transfer speed of the serial bus. This serves to enhance the SPD data read speed of the FW or OS as well as the speed of memory initialization.

In response to the SPD data read instruction from the PRS 42, the SPD readout unit 120 reads the SPD data stored in the SPD memory 60, and stores it into the SPD storage unit 130. Further, the SPD readout unit 120 loads the thus readout SPD data into the read data register 113 in the SPD transfer unit 110. The function of the SPD readout unit 120 may be divided between an SPD readout sequencer 122 and an SPD read/write controller 124.

The SPD readout sequencer 122 manages the state transitions associated with such operations as the reception of the read command and SPD address at the SPD transfer unit 110, the reception of the SPD read instruction from the PRS 42, and the reading of the SPD data from the SPD memory 60. Based on the state transitions managed by the SPD readout sequencer 122, the SPD read/write controller 124 can control signals to be transferred to and from the SPD transfer unit 110, the SPD storage unit 130, and the serial bus controller 146.

The SPD readout sequencer 122 and the SPD read/write controller 124 can each be implemented, for example, by a sequential circuit such as a latch, a flip-flop, a register file, or the like.

When the read command and the read address are received from the SPD readout sequencer 122, the SPD read/write controller 124 reads the SPD data from the SPD memory 60 via the serial bus controller 146 and via the serial bus 90b. The SPD read/write controller 124 stores the SPD data thus read out of the SPD memory 60 into the SPD storage unit 130.

The SPD storage unit 130 provides a storage area for buffering the SPD data that the SPD readout unit 120 retrieved from the SPD memory 60. The SPD storage unit 130 can be implemented using a latch, FF, RF, RAM, or the like. The SPD storage unit 130 is capable of high-speed operation as it operates at the clock of the MAC 40. When accessing the SPD data stored in the SPD storage unit 130, the processor 10 can access and read the SPD data via the high-speed system bus 92a, not via the serial bus 90b.

The SPD readout sequencer 122 can read the SPD data by incrementing the SPD address by changing the read channel, the read slot, and the memory address in the SPD memory. The SPD data read operation flow will be described later with reference to FIG. 7 or 8. The SPD memory 60 has a capacity, for example, of 256 bytes per memory, but all the 256 bytes of data need not be stored into the SPD memory 60.

When a read request is issued from the FW or OS, if the SPD data specified by the read address is stored in the SPD storage unit 130, in other words, if the address hits, the SPD read/write controller 124 reads the SPD data from the SPD storage unit 130 and loads it into the read data register 113 in the SPD transfer unit 110. If the SPD data specified by the read address is not stored in the SPD storage unit 130, the SPD data is read out of the SPD memory 60 and loaded into the SPD readout register 144.

Ideally, the initialization process should be performed concurrently for all the components in the information processing apparatus 1, but in actuality, due to the physical constraints associated with the configuration of the components and due to the need for simplicity of control, it is not possible to perform the initialization process in a perfectly concurrent manner. As a result, it takes time to initialize all the components. When the processor 10 initiates the read operation by reading the SPD data from the SPD memory 60, the memory recognizing process takes an extremely long time in terms of intra-chip clock, and this has been a major factor slowing the memory initialization process as well as the computer system startup process.

Figure 2:
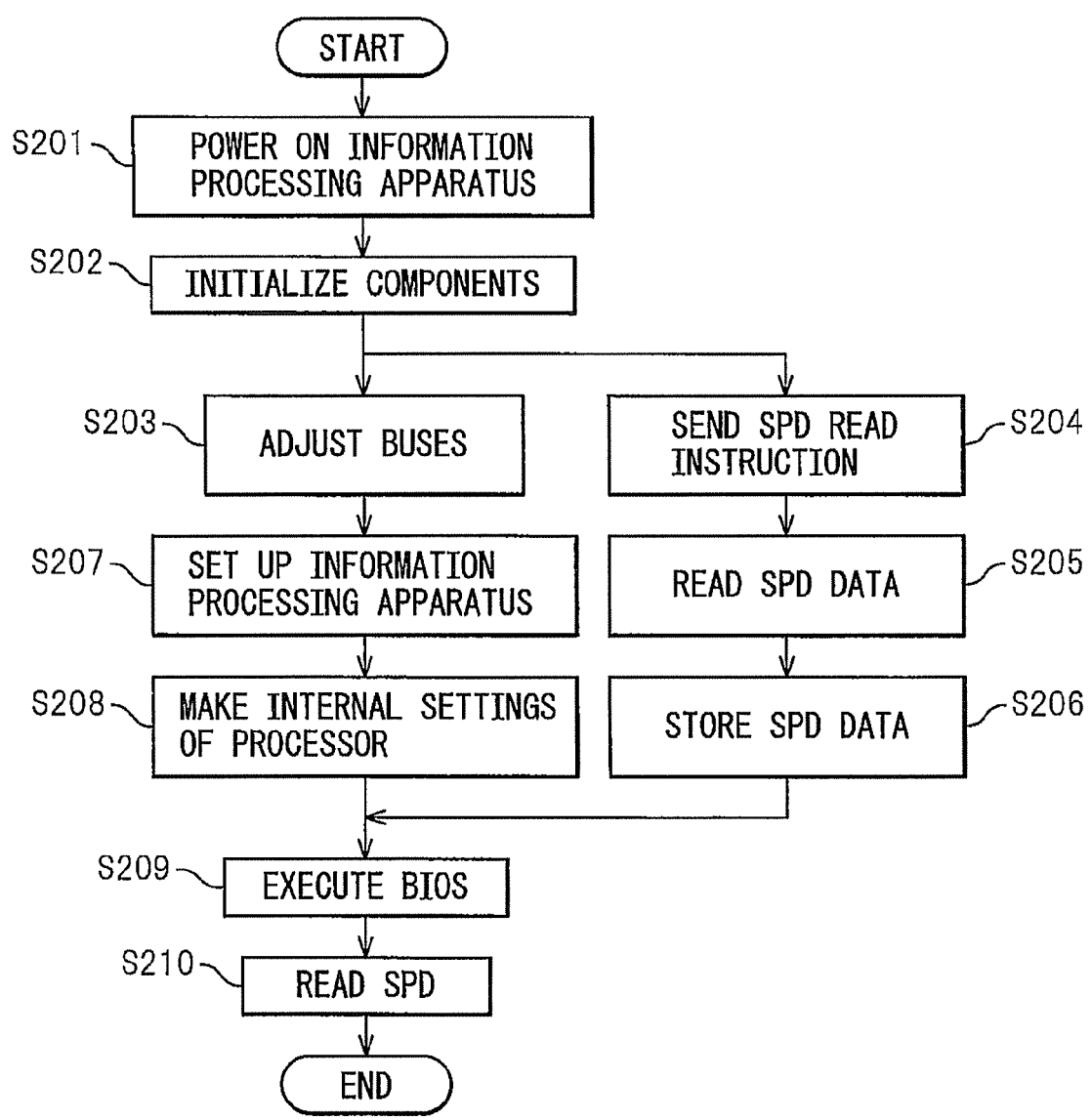
FIG. 2 is a flowchart of a memory recognizing process that an SPD control device performs independently of the initialization of a processor.

In consideration of the above, one example of the memory recognizing process that the SPD control device 100 performs independently of the initialization of the processor 10 will be described with reference to FIG. 2.

First, when the information processing apparatus 1 is powered on by the user pressing the power switch of the information processing apparatus 1 (S201), the various components such as the MCH 20 and MAC 40 in the information processing apparatus 1 are powered on, clocks are supplied, register values are reset, and so on, to perform initialization (S202). When the MAC 40 is powered on, the buses interconnecting the various devices are adjusted (S203), and concurrently with S203, the PRS 42 starts up and sends an SPD read instruction to the SPD readout sequencer 122 (S204).

In response to the SPD read instruction, the SPD readout sequencer 122 loads the read command and the SPD address into a register in the SPD read/write controller 124. When the read command and the SPD address are received from the SPD readout sequencer 122, the SPD read/write controller 124 reads the SPD data from the SPD memory 60 via the serial bus 90b under the control of the serial bus controller 146 (S205). The SPD read/write controller 124 stores the SPD data thus read out of the SPD memory 60 into the SPD storage unit 130 via the SPD readout register 144 (S206).

Concurrently with the SPD data read operation, and following the adjustment of the buses interconnecting the various devices (2203), the entire information processing apparatus 1 is set up by checking power supply to the ICH 70, setting the system buses, enabling the IO port of the ICH 70, setting the system, setting the ROM 80, etc. (S207), and the internal settings of the processor 10, such as control register and translation look-aside buffer (TLB) initialization, are made (S208). By performing such processing, the processor 10 is enabled to process instructions, and the processor 10 executes the BIOS in order to perform the memory initialization process (S209).

At this time, the SPD data stored in S206 is held in the SPD storage unit 130 of the MAC. The processor 10 reads the SPD data buffered in the SPD storage unit 130, not via the serial bus 90b, but via the SPD transfer unit 110 and via the system bus 92a (S210), and the flow of FIG. 2 is terminated.

In this way, since the operation for reading the SPD data from the SPD memory 60 is started upon power-on of the SPD control device 100, the SPD control device 100 according to the present embodiment can start the SPD data read operation before the initialization of the processor is completed. Furthermore, since the reading of the SPD data via the serial bus can be completed before the initialization of the processor is completed, the startup time of the OS, etc. can be shortened by starting the initialization of the memory module without having to read the SPD data after starting up the processor.

As the number of memory modules 50 connected to the MAC 40 increases, the amount of the SPD data that the SPD storage unit 130 stores increases. On the other hand, all the SPD data corresponding to all the memory modules 50 may be stored in the SPD storage unit 130 so that the data read from the SPD memory 60 will not occur by responding to the SPD read instruction from the OS or FW. In view of this, the SPD storage unit 130 stores the SPD data by compressing the data, which serves to reduce the necessary storage capacity.

Figure 3:
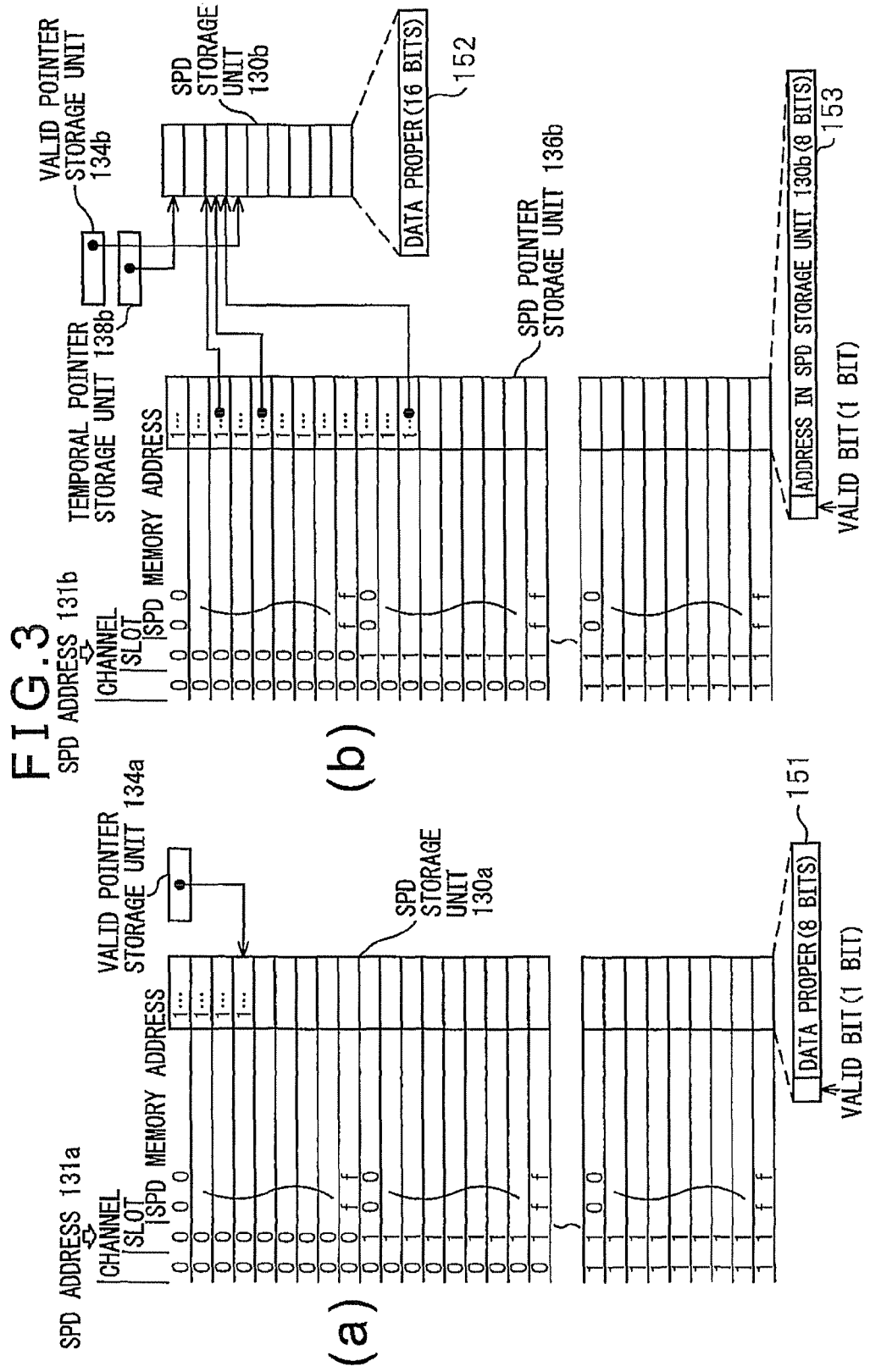
FIG. 3 is a diagram illustrating one configuration example of an SPD storage unit.

One configuration example of the SPD storage unit will be described below with reference to FIG. 3. Generally, due to limitations imposed by system specification or system operation, memory modules conforming to the same standard are mounted on the same channel or same slot. As a result, the contents of the SPD data are mostly common among the memory modules and only partially differ. When compressing the SPD data to be buffered in the SPD storage unit, the SPD data is compressed by exploiting the SPD data commonality.

FIG. 3A is a diagram illustrating one example of the device configuration of the SPD storage unit when storing the SPD data in the SPD storage unit without compressing the data. In the example illustrated in FIG. 3A, the SPD storage unit 130 in the SPD control device 100 comprises an SPD storage unit 130a plus a valid pointer storage unit 134a.

As illustrated in FIG. 3A, an SPD address 131a within the SPD storage unit 130a comprises a channel number, a slot number, and a memory address in the SPD memory and, using this combination, specific SPD data in the memory module 50 can be addressed. Preferably, the SPD address 131a is an address that can specify any SPD data in any SPD memory 60 so that any SPD data requested to be read out can be found in the SPD storage unit 130*a*.

The memory space of the SPD memory 60 is defined, for example, by the specification "JEDEC Standard No. 21-C, Page 4.1.2.4-1, Appendix D, Rev. 1.0: SPD's for DDR SDRAM," provided by the JEDEC (Joint Electron Devices Engineering Council). In this case, the memory space of the SPD memory 60 is defined by 8-bit rows defining the number of addresses in the SPD memory 60 and 8-bit columns defining the SPD data proper stored at each address.

In the case of the above JEDEC specification, the memory space illustrated in FIG. 3A is defined, for example, by rows, each consisting of channel number (1 bit)+slot number (1 bit)+memory address in SPD memory (8 bits), and columns of valid bit (1 bit)+data proper (8 bits). That is, the format 151 of the data stored at each SPD address 131*a* has a data width equal to valid bit (1 bit)+data proper (8 bits). Here, the valid bit is a bit that indicates whether the data stored at the corresponding SPD address in the SPD memory 60 is present in the SPD storage unit 130*a*. The valid bit "1" indicates that the SPD data is present, while the valid bit "0" indicates that the SPD data is not present.

As illustrated in FIG. 3A, the SPD address 131*a* is numbered sequentially in ascending order of channel number, slot number, and SPD memory address. Of the entries read out of the SPD memory 60 in ascending order and stored into the SPD storage unit 130*a* in ascending order of the SPD address, the valid pointer storage unit 134*a* stores the SPD address of the last entry as the pointer. The data indicating the address of the last entry is called the "valid pointer." The valid pointer thus indicates up to which SPD address 131*a* the SPD data has been stored as counted in ascending order of the SPD address. To store the SPD address, the valid pointer storage unit 134*a* has a 10-bit data width that matches the address width of the SPD address 131*a*. The valid pointer is used to register the SPD data into the SPD storage unit 130*a* in accordance with the SPD address (as will be described later).

FIG. 3B is a diagram illustrating one example of the device configuration of the SPD storage unit when storing the SPD data in the SPD storage unit by compressing the data. In the example illustrated in FIG. 3B, the SPD storage unit 130 in the SPD control device 100 comprises an SPD storage unit 130*b*, a valid pointer storage unit 134*b*, an SPD pointer storage unit 136*b*, and a temporal pointer storage unit 138*b*.

According to the JEDEC specification, the data width of the SPD memory is 8 bits, but contrary to the JEDEC specification, there are cases where the data width of the SPD memory becomes greater than 8 bits. For example, according to "Module Data Width" provided in the JEDEC specification, the data width of a memory module is defined using two 8-bit data. However, there are some proprietary SPD memories in which the module data width is defined using a single 16-bit data contrary to the JEDEC specification. In that case, the SPD storage unit 130*a* needs to provide a 16-bit data width.

In FIG. 3B, to compress the SPD data having a 16-bit data width such as described above, SPD data consolidated into one unique data by removing overlapping portions from the common SPD data is stored in the SPD storage unit 130*b*. When using a plurality of memory modules of the same specification, such data compression is particularly useful because the same data is read out of the same SPD memory address, with the only difference in channel number and slot number.

The format 152 of the data stored at each address in the SPD storage unit 130*b* has a data width equal to that of the data proper stored in the SPD memory 60. The data proper consists, for example, of 16 bits. Further, in the present embodiment, since the SPD storage unit 130*b* has an address range from 00 to ff, the address width of the SPD storage unit 130*b* is 8 bits.

In the SPD pointer storage unit 136*b*, as in the SPD storage unit 130*a*, an SPD address 131*b* comprises a channel number, a slot number, and an SPD memory address and, using this combination, specific SPD data in the memory module 50 can be addressed. Preferably, the SPD address 131*b* is an address that can specify any SPD data in any SPD memory 60 so that any SPD data requested to be read out can be found in the SPD storage unit 130*b*. In the SPD pointer storage unit 136*b*, the format 153 of the data stored at each SPD address 131*b* has a data width equal to valid bit (1 bit)+address width (8 bits) of the SPD storage unit 130*b*.

Of the entries read out of the SPD memory 60 in ascending order and stored into the SPD storage unit 130*b* in ascending order of the SPD address by removing overlapping portions from the SPD data, the valid pointer storage unit 134*b* stores the SPD address of the last entry. The address of the last entry, i.e., the valid pointer, indicates up to which SPD address 131*b* the SPD data has been stored as counted in ascending order of the SPD address. To store the address used in the SPD storage unit 130*b*, the valid pointer storage unit 134*b* has an 8-bit data width that matches the address width of the SPD storage unit 130*b*. The valid pointer is used to register the SPD data into the SPD storage unit 130*b* (as will be described later).

The temporal pointer storage unit 138*b* stores as a temporal pointer the address in the SPD storage unit 130*b* that is used when selecting SPD data unique to the SPD storage unit 130*b* by removing overlapping portions from the SPD data. The address in the SPD storage unit 130*b* that is stored here is the address in the SPD storage unit 130*b* corresponding to the SPD data already registered in the SPD storage unit 130*b*. By incrementing the address stored in the temporal pointer storage unit 138*b*, the already registered SPD data can be matched against the SPD data stored in the SPD memory 60. To store the address used in the SPD storage unit 130*b*, the temporal pointer storage unit 138*b* has an 8-bit data width that matches the address width of the SPD storage unit 130*b*. The method for using the information stored in the temporal pointer storage unit 138*b* will be described in detail later with reference to FIGS. 5 and 6.

When the data width of the SPD memory 60 is 16 bits, the SPD storage unit 130*a* illustrated in FIG. 3A has a memory space equivalent to all the SPD addresses 131*a* (number of channels/slots (4 bits)×SPD memory address (256 bits))×data width (1 bit+16 bits). On the other hand, the SPD pointer storage unit 136*b* illustrated in FIG. 3B has a memory space equivalent to all the SPD addresses 131*a*, i.e., number of channels/slots (4 bits)×SPD memory address (256 bits)×data width (9 bits). The SPD storage unit 130*b* has a memory space equivalent to SPD memory address (256 bits)×data width (16 bits).

The data compression rate in this case is given by the following equation.

Memory capacity illustrated in FIG. 3*B*/Memory capacity illustrated in FIG. 3*A*=(4×256×9+256× 16)/(4×256×17)=0.76

That is, the memory capacity illustrated in FIG. 3B achieves a data compression of 23 to 24% with respect to the memory capacity illustrated in FIG. 3A. This compression effect further increases when the number of channels and slots is increased. For example, when the number of channels and slots is 32, and 32 identical memory modules are mounted, the data compression rate is given by the following equation.

Memory capacity illustrated in FIG. 3B/Memory
capacity illustrated in FIG. 3A=(32×256×9+256×
16)/(32×256×17)=0.56

The memory capacity illustrated in FIG. 3B thus achieves a data compression of about 44% with respect to the memory capacity illustrated in FIG. 3A. The SPD data may contain the same bit string even when the information represented by the data is different. In this case also, the overlapping data is removed from the SPD data to be stored in the SPD storage unit 130b, which provides an additional data compression effect not expressed by the above equation.

In the present embodiment, since the SPD data for a large number of memory modules mounted in the information processing apparatus 1 can be compressed for storage, as described above, the size and cost of the SPD storage unit 130 can be reduced.

Figure 4:
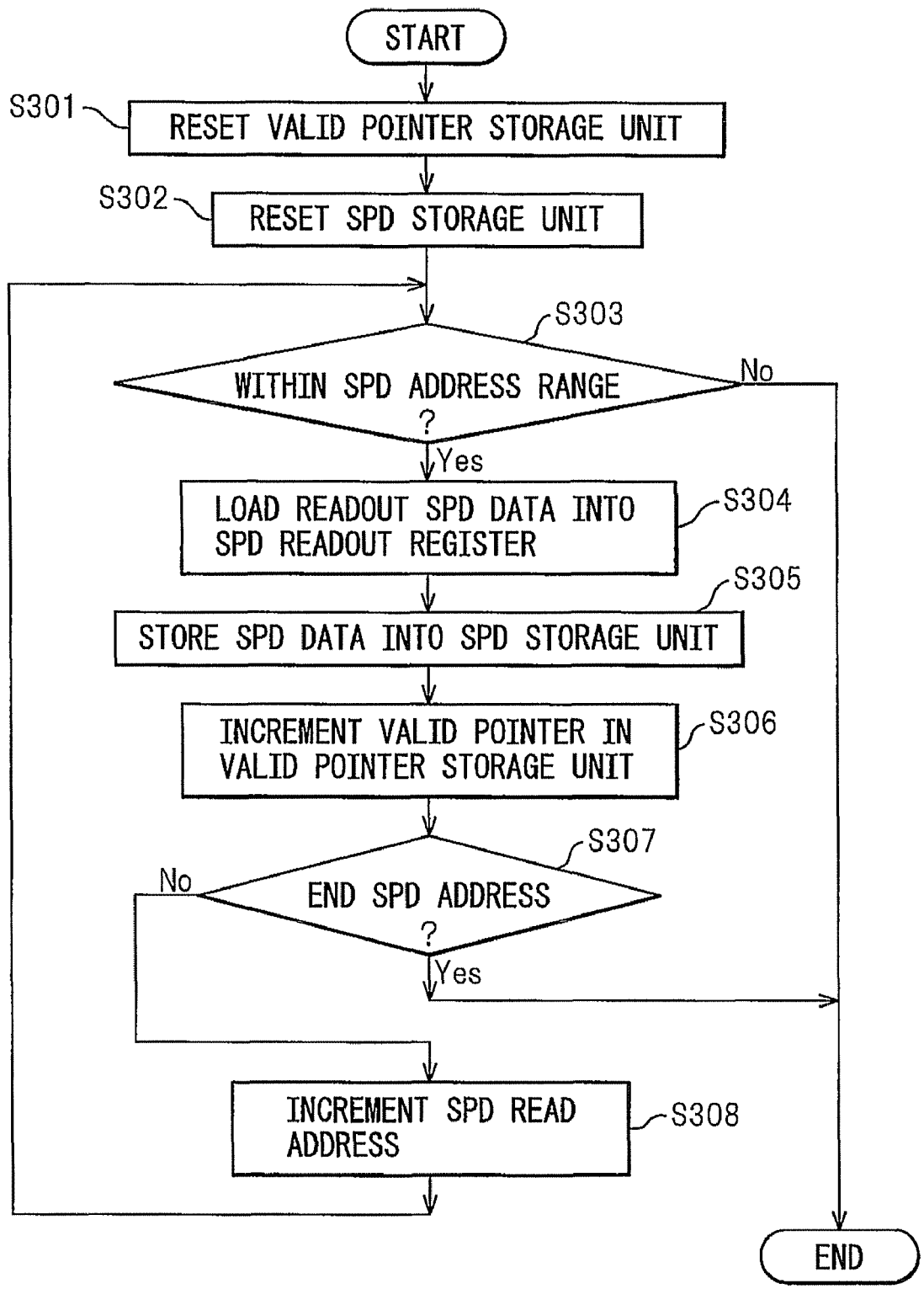
FIG. 4 is a diagram illustrating one example of a flow for registering SPD data into an SPD storage unit.

One example of a flow for registering the SPD data into the SPD storage unit 130a will be described with reference to FIG. 4. The SPD data registration flow illustrated in FIG. 4 may be carried out in the SPD readout process (S204 to S206) during the startup of the information processing apparatus 1 described with reference to FIG. 2, or may be carried out when the SPD data corresponding to the SPD data read request from the OS or FW is not found in the SPD storage unit 130.

First, the SPD readout sequencer 122 sends a read command and an SPD address to the SPD read/write controller 124. When the SPD address is received from the SPD readout sequencer 122, the SPD read/write controller 124 first resets the contents of the valid pointer storage unit 134a to "−1" (S301). The SPD read/write controller 124 resets all the contents of the SPD storage unit 130a to 0 (S302). For example, the resetting is made such that the channel number=0, the slot number=0, and the offset in SPD=0.

The SPD readout sequencer 122 checks whether the SPD read address is within the SPD address range of all the SPD memories 60 connected to the MAC 40 (S303). For the first read operation, the SPD address is set with the channel number=0, the slot number=0, and the offset in SPD=0, as described above. The SPD address range of the SPD memories 60 to be checked in S303 is defined, for example, as the channel number being in the range of 0 to 4, the slot number in the range of 0 to 1, and the SPD memory address in the range of 0 to 255. If the SPD read address is within the SPD address range (Yes in S303), the SPD read/write controller 124 reads the SPD data from the SPD memory 60 and loads the thus readout SPD data into the SPD readout register 144 (S304). If the SPD read address is not within the SPD address range (No in S303), the process flow is terminated by determining that all the SPD data in the SPD range have been read out.

The SPD read/write controller 124 causes the SPD data loaded in the SPD readout register 144 to be stored at the corresponding SPD address 131a in the SPD storage unit 130 (S305). Next, the SPD read/write controller 124 enables (turns on) the starting bit of the SPD address stored in the SPD storage unit 130, and increments the valid data count in the valid pointer storage unit 134a by 1 (S306).

If it is determined by the SPD readout sequencer 122 that the valid data count stored in the valid pointer storage unit 134a does not correspond to the end SPD address of the SPD address range acquired in S303 (No in S307), the process proceeds to S308. On the other hand, if it is determined that the valid data count stored in the valid pointer storage unit 134a corresponds to the end SPD address of the SPD address range (Yes in S307), the flow is terminated by determining that all the SPD data in the SPD range have been read out. In S308, the SPD read/write controller 124 increments the SPD read address, and the process returns to S303 to repeat the above steps S303 to S307 to read out further SPD data.

Figure 5:
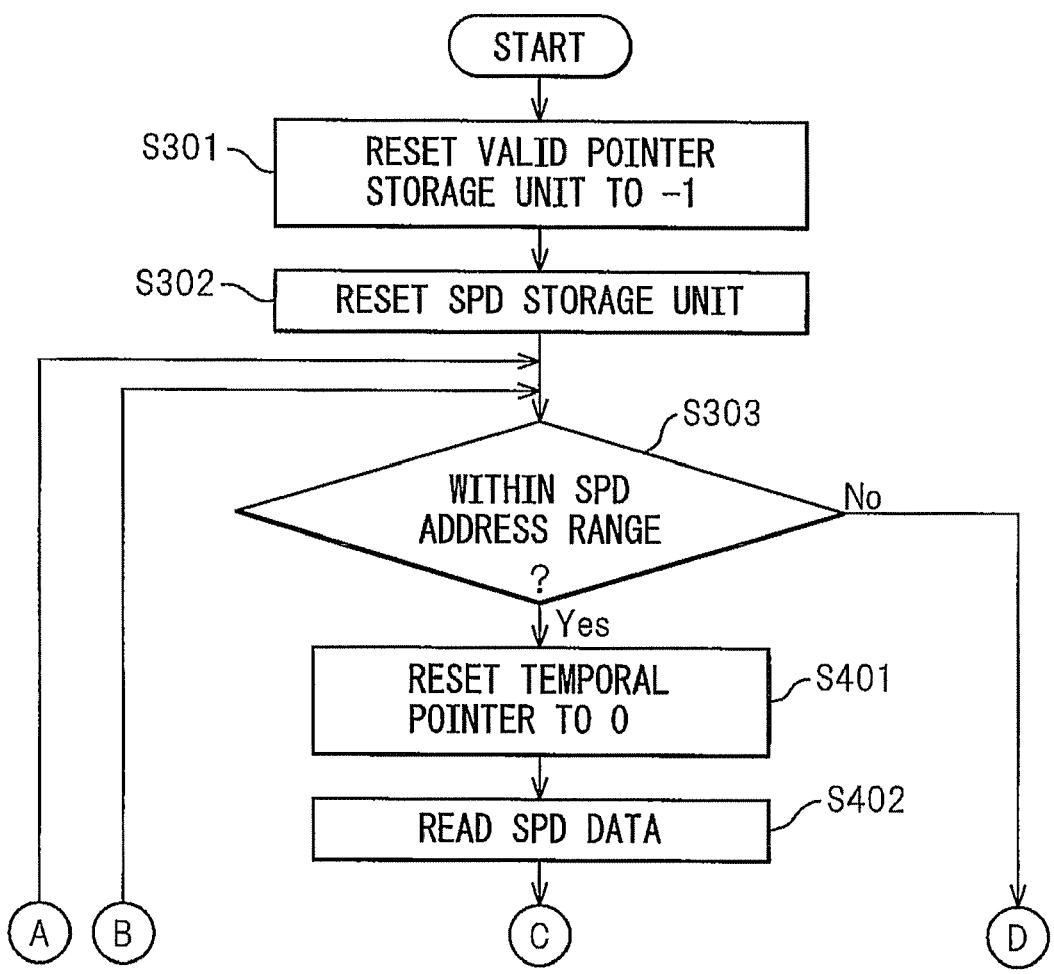
FIG. 5 is a diagram illustrating one example of a flow for registering SPD data into an SPD storage unit.
Figure 6:
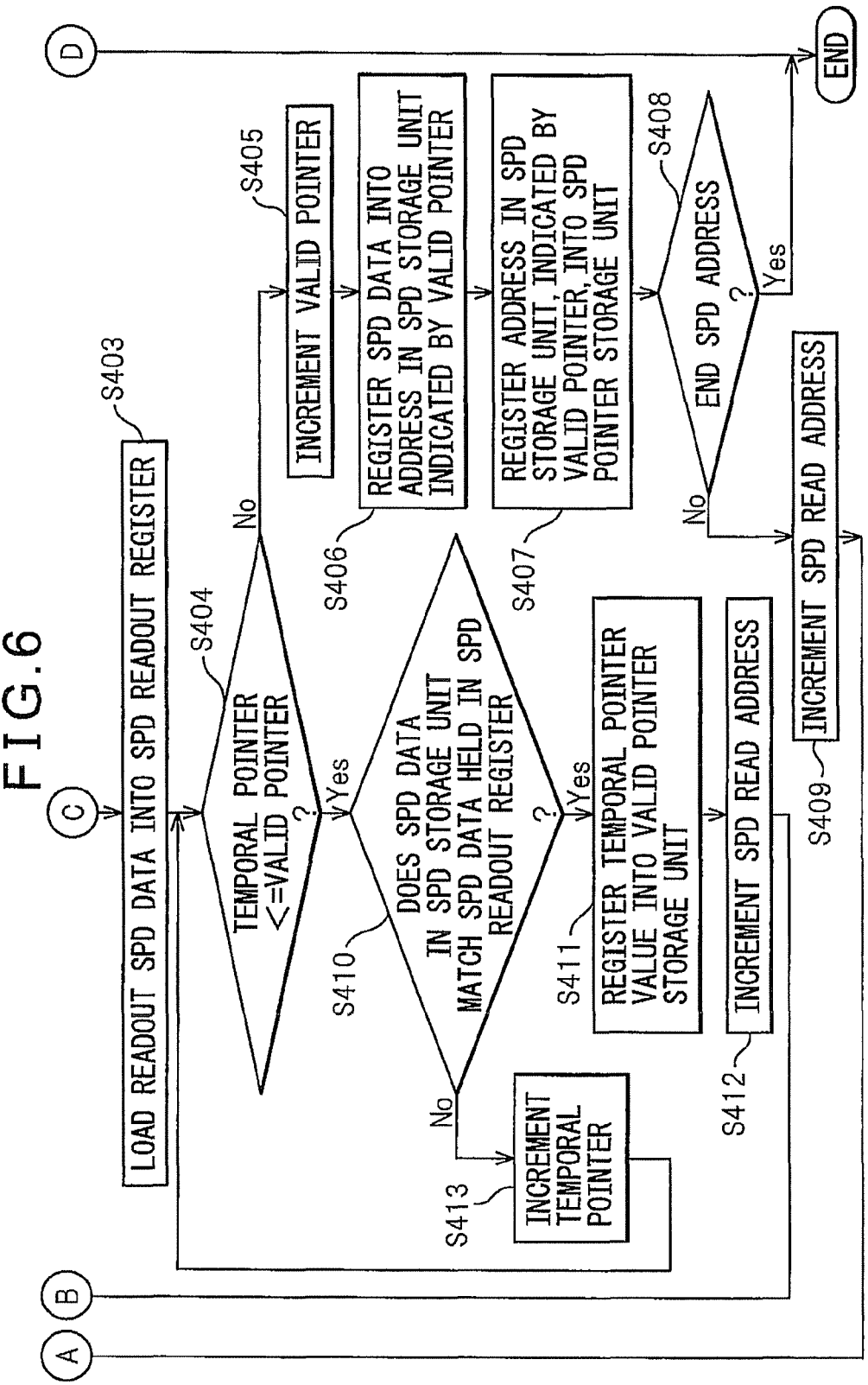
FIG. 6 is a diagram illustrating one example of a flow for registering SPD data into the SPD storage unit.

One example of a flow for registering the SPD data into the SPD storage unit 130b will be described with reference to FIGS. 5 and 6. S301 to S303 in the registration flow of FIG. 5 are the same as the corresponding steps S301 to S303 in the registration flow described with reference to FIG. 4. After S303, the SPD read/write controller 124 resets the temporal pointer storage unit 138b to "0" (S401). The SPD read/write controller 124 reads the SPD data from the SPD memory 60 in accordance with the received read command and SPD address (S402), and loads the thus readout SPD data into the SPD readout register 144 (S403).

The SPD readout sequencer 122 compares the contents of the valid pointer storage unit 134b with the contents of the temporal pointer storage unit 138b (S404). If the valid data count stored in the valid pointer storage unit 134b is larger than the data count stored in the temporal pointer storage unit 138b (No in S404), the process proceeds to S405 in order to newly register the SPD data into the SPD data storage unit 130b. On the other hand, if the valid data count stored in the valid pointer storage unit 134b is not larger than the data count stored in the temporal pointer storage unit 138b (Yes in S404), the process proceeds to S410 in order to newly register the address of the SPD data storage unit 130b into the SPD pointer storage unit 136b.

In S405 to S409, the SPD read/write controller 124 performs processing for registering the address of the SPD data storage unit 130b into the SPD pointer storage unit 136b.

First, the SPD read/write controller 124 increments the valid pointer in the valid pointer storage unit 134b as the number of valid data stored in the SPD storage unit 130b increases (S405). The SPD read/write controller 124 registers the SPD data read out in S402 into the address in the SPD storage unit 130b that takes the same value as the valid pointer stored in the valid pointer storage unit 134b (S406). When newly registering the SPD data into the SPD storage unit 130b, the valid pointer storage unit 134b uses the valid pointer incremented in S405 as it indicates the number of valid data stored in the SPD storage unit 130b.

Next, since the SPD data is newly registered in S406, the address in the SPD storage unit 130b that indicates the registered SPD data is registered into the SPD pointer storage unit 136b under the control of the SPD read/write controller 124 (S407). The SPD readout sequencer 122 determines whether the SPD address has reached the end address by checking whether the valid pointer is larger than the end address of the SPD storage unit 130b (S408). If the valid pointer is larger than the end address (Yes in S408), this means that SPD information has been stored at all the addresses in the SPD storage unit 130b; therefore, the flow is terminated. If the valid pointer is smaller than the end address (No in S408), this means that further SPD data can be stored in the SPD storage unit 130b; therefore, the SPD read address is incremented (S409), and the process returns to S303 to repeat the above process. If the valid pointer is equal to the end address (Yes in S408), the flow is terminated by determining that the SPD address has reached the end address.

In S410, it is determined whether the SPD data in the SPD storage unit 130b, indicated by the temporal pointer in the temporal pointer storage unit 138b, matches the SPD data held in the SPD readout register 144 in S403 (S410). If they match (Yes in S410), the temporal pointer is recorded in the SPD pointer storage unit 136b (S411). In S412 that follows S411, the SPD read address is incremented so that the process proceeds to the next SPD address. If they do not match (No in S410), the temporal pointer is incremented to refer to the next valid data in the SPD storage unit 130b (S413).

Figure 7:
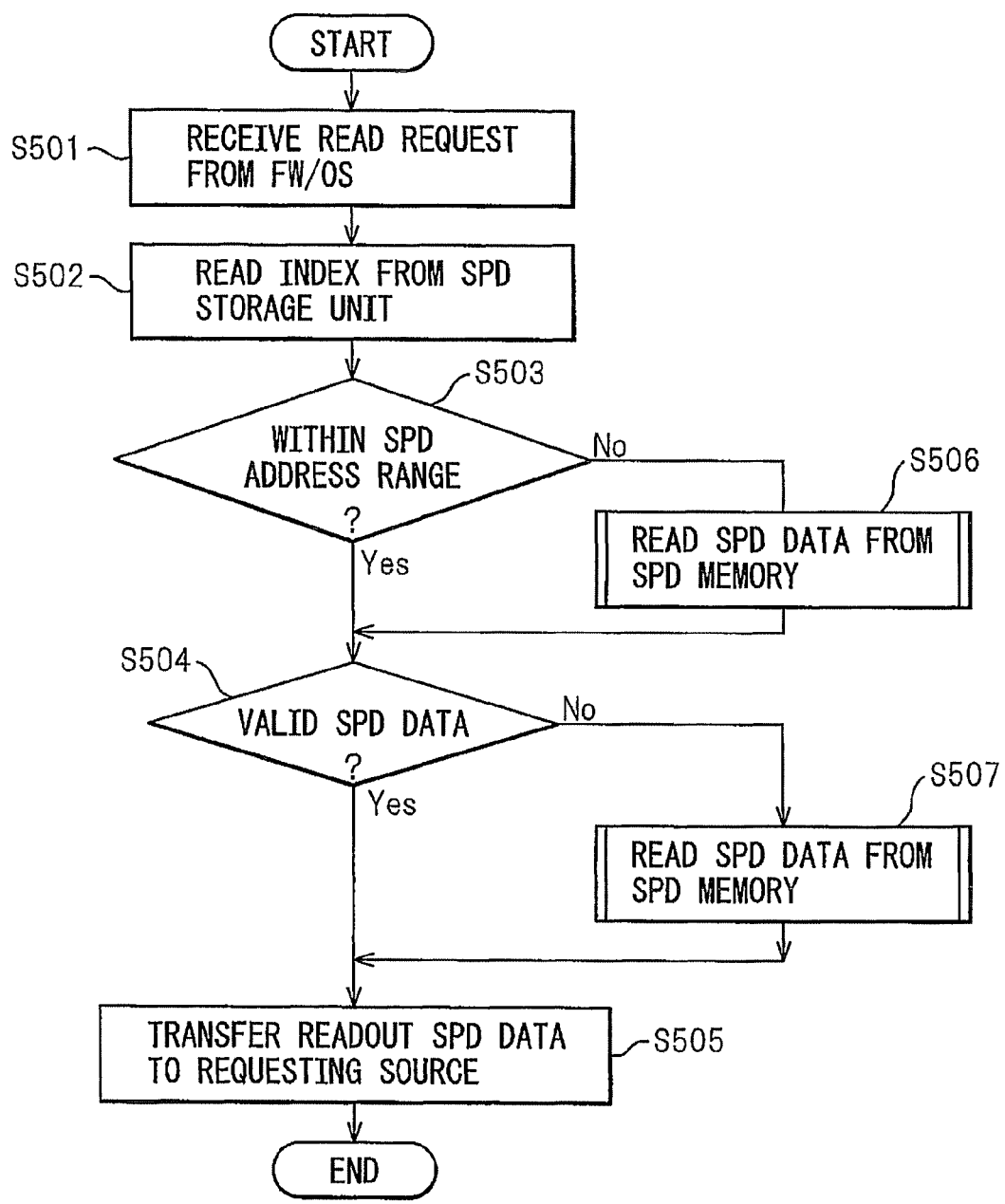
FIG. 7 is a diagram illustrating one example of a flow for reading the SPD data from the SPD storage unit by a read request from FW or OS.

One example of a flow for reading the SPD data from the SPD storage unit 130a by a read request from the FW or OS will be described with reference to FIG. 7. First, the SPD transfer unit 110 receives the read request from the FW or OS along with the SPD read address contained in the read request (S501). The SPD addresses to be read here refer to all the SPD addresses in a particular memory module or all the SPD addresses in all the memory modules. The SPD read/write controller 124 reads all the SPD addresses 131a from the SPD storage unit 130a (S502).

The SPD readout sequencer checks whether the read address received in S501 is within the range of all the SPD addresses 131a read in S502 (S503). If the SPD read address is not within the valid SPD address range (No in S503), the operation for reading the SPD specification information from the SPD memory 60, as described in S304 and S305 in FIG. 4, is carried out (S506), and the SPD data located at the SPD read address is stored into the SPD storage unit 130a or 130b, after which the process proceeds to S504. The situation where the SPD data corresponding to the read request from the FW or OS is not found in the SPD storage unit 130a occurs, for example, when the SPD data read operation before the initialization of the processor, such as previously described with reference to FIG. 2, is disabled. S503 and S506 can provide fault processing to handle such a situation. If, in S503, the address is within the valid SPD address range (Yes in S503), the process proceeds to S504.

In S504, it is determined whether the readout SPD data is valid or not. Here, since "−1" is input to the SPD storage unit 130a, it can be determined based on that value whether the SPD data is valid or not. If the SPD data is not valid (No in S504), the process proceeds to S507 to read the SPD data from SPD once again. In S507, the operation for reading the SPD specification information from the SPD memory 60, as described in S304 and S305 in FIG. 3, is carried out (S507). After the completion of the read operation, the process proceeds to S505. If the SPD data is valid (Yes in S504), the readout SPD data is transferred to the requesting FW or OS via the SPD data transfer unit 110 (S505), and the SPD data read flow is terminated.

One example of a flow for reading the SPD data from the SPD storage unit 130b by a read request from the FW or OS will be described with reference to FIG. 8. First, the SPD read/write controller 124 receives the read request from the FW or OS along with the SPD read address contained in the read request (S601). Then, the SPD read/write controller 124 reads the pointer stored at the SPD read address from the SPD pointer storage unit 136b (S602). The SPD read/write controller 124 checks whether the readout pointer is valid or not (S603). In other words, the SPD read/write controller 124 checks whether the valid bit in the pointer stored at the received SPD read address 131b in the SPD pointer storage unit 136b is "1" or "0". When the valid bit is "0", the address of the SPD storage unit 130b is not stored at the corresponding data entry. If the pointer is not valid (No in S603), processing is performed to register the SPD data into the SPD storage unit 130b. That is, the SPD read/write controller 124 acquires a valid pointer from the valid pointer storage unit 134b (S606). Then, by carrying out the steps S303 and S401 to S413 in FIG. 5, the SPD data is read from the SPD memory, and the SPD data is registered into the SPD storage unit 130b (S607). After completing the SPD read operation, the process proceeds to S604.

On the other hand, if it is determined in S603 that the pointer is valid (Yes in S603), the SPD data is read from the SPD storage unit 130b by referring to the address of the SPD storage unit 130b stored in the SPD pointer storage unit 136b (S604).

The SPD read/write controller 124 transfers the readout SPD data to the requesting FW or OS via the SPD data transfer unit 110 (S605), and the SPD data read flow is terminated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiment(s) of the present invention have been described in detail, it should be understood that the various changes, substitutions, and alterations could be made hereto without departing from the spirit and scope of the invention.

What is claimed is:

1. A control device coupled to a processor, a memory module, and a specification information storage memory for storing specification information indicating specifications of the memory module, the control device comprising:
   a readout unit that reads the specification information from the specification information storage memory without having to wait for the processor to complete an initialization process of the processor when power is turned on to the control device;
   a storage unit that stores the specification information read from the specification information storage memory; and
   a transfer unit that transfers the specification information stored in the storage unit to the processor in response to a reception of a read instruction from the processor to read the specification information.

2. A control device coupled to a processor, a memory module, and a specification information storage memory for storing specification information indicating specifications of the memory module, the control device comprising:
   a readout unit that reads the specification information from the specification information storage memory when power is turned on to the control device;
   a storage unit that stores the specification information read from the specification information storage memory; and
   a transfer unit that receives a read instruction from the processor to read the specification information, and that transfers the specification information stored in the storage unit to the processor, wherein
   the control device is connected to a plurality of memory modules and a plurality of the specification information storage memories corresponding, respectively, to the plurality of memory modules, and
   the storage unit stores specification information obtained by removing any overlapping portion from a plurality of sets of the specification information stored in the plurality of specification information storage memories, and wherein
   the control device further includes a pointer storage unit for storing pointer information indicating an address in the storage unit, by associating the pointer information with location information of the memory module, and the readout unit receives a specification information read instruction containing the location information of the memory module to be read, retrieves from the pointer storage unit the pointer information associated with the location information of the memory module, and retrieves the specification information from the address in the storage unit indicated by the retrieved pointer information.

3. The control device according to claim 1, wherein the readout unit transfers the specification information to the processor by a burst transfer.

4. An information processing apparatus comprising:
a processor;
a memory module includes a first memory, and a second memory for storing specification information indicating specifications of the memory module; and
a control device includes
a readout unit that reads the specification information from the second memory without having to wait for the processor to complete an initialization process of the processor when power is turned on to the control device;
a storage unit that stores the specification information read by the readout unit; and
a transfer unit that transfers the specification information stored in the storage unit to the processor in response to a reception of a read instruction from the processor to read the specification information.

5. The information processing apparatus according to claim 4, wherein the control device is a memory control device for controlling access to the memory module.

6. An information processing apparatus comprising:
a processor;
a memory module includes a first memory, and a second memory for storing specification information indicating specifications of the memory module; and
a control device includes
a readout unit that reads the specification information from the second memory when power is turned on to the control device;
a storage unit that stores the specification information read by the readout unit; and
a transfer unit that receives a read instruction from the processor, and for transferring the specification information stored in the storage unit to the processor, wherein
the control device is connected to a plurality of memory modules and a plurality of the specification information storage memories corresponding, respectively, to the plurality of memory modules, and
the storage unit stores specification information obtained by removing any overlapping portion from a plurality of sets of the specification information stored in the plurality of specification information storage memories,
wherein the control device further includes a pointer storage unit for storing pointer information indicating an address in the storage unit, by associating the pointer information with location information of the memory module, and
the readout unit receives a specification information read instruction containing the location information of the memory module to be read, retrieves from the pointer storage unit the pointer information associated with the location information of the memory module, and retrieves the specification information from the address in the storage unit indicated by the retrieved pointer information.

7. The information processing apparatus according to claim 4, wherein the readout unit transfers the specification information to the processor by a burst transfer.

8. A method recognizing a memory module by a control device, the control device having a storage unit, and coupled to a processor, a memory module, and a specification information storage memory for storing specification information indicating specifications of the memory module, the method comprising:
reading the specification information from the specification information storage memory without having to wait for the processor to complete an initialization process of the processor when power is turned on to the control device,
storing the specification information read from the specification information storage memory into the storage unit, and
transferring the specification information stored in the storage unit to the processor in response to a reception of a read instruction from the processor to read the specification information.

9. The method according to claim 8, wherein
the control device further comprising a pointer storage unit that store pointer information indicating an address in the storage unit, wherein
the control device stores specification information obtained by removing any overlapping portion from a plurality of sets of the specification information stored in the plurality of specification information storage memories into the storage unit,
stores pointer information indicating an address in the storage unit into the pointer storage unit by associating the pointer information with location information of the memory module,
receives a specification information read instruction containing the location information of the memory module to be read,
retrieves the pointer information associated with the location information of the memory module from the pointer storage unit, and
retrieves the specification information from the address in the storage unit indicated by the retrieved pointer information.

10. The method according to claim 8, further including:
transferring the specification information to the processor by a burst transfer.

11. The method according to claim 8, further comprising:
reading the specification information via the serial bus connecting the control device and a plurality of the specification information storage corresponding to the memory module respectively, and
transferring the specification information via the system bus connecting the control device and a plurality of memory modules and the processor.

* * * * *